United States Patent [19]
Farnsworth

[11] 3,828,204
[45] Aug. 6, 1974

[54] SENSITIVE PULSE THRESHOLD DETECTOR

[75] Inventor: Robert P. Farnsworth, Los Angeles, Calif.

[73] Assignee: Hughes Aircraft Company, Culver City, Calif.

[22] Filed: Apr. 16, 1973

[21] Appl. No.: 351,686

[52] U.S. Cl. ............ 307/235 R, 307/322, 328/146, 330/9, 330/25
[51] Int. Cl. ..... H03k 5/20, H03k 17/58, H03f 1/02
[58] Field of Search ............ 307/235 R, 235 A, 239, 307/286, 322, 290, 269; 328/146, 148, 149, 150, 151, 203, 206; 330/9, 25, 30 D, 69

[56] References Cited

UNITED STATES PATENTS

| | | | |
|---|---|---|---|
| 3,427,472 | 2/1969 | Karner | 307/235 |
| 3,516,002 | 6/1970 | Hillis | 330/9 X |
| 3,541,320 | 11/1970 | Beall | 330/9 X |
| 3,628,059 | 12/1971 | Niu | 307/235 R |
| 3,679,916 | 7/1972 | Siebers | 307/290 |
| 3,753,139 | 8/1973 | Spencer | 330/30 D X |

OTHER PUBLICATIONS

Crawford, "Threshold Detector," IBM Tech. Discl. Bull., vol. 7, No. 10, p. 964–965, 3/1965.
Ghelfan, "Fast Recovery, High Input Impedance Tunnel Diode Comparator," Nuclear Instruments & Methods, Vol. 103, No. 2, p. 405–406, 9/1972; North Holland Pub. Co.
Jaeger et al., "Dynamic Zero–Correction Method Suppresses OFFSET Error in OP Amps"; Electronics, p. 109–110, 12/4/1972.
Hearn, "Applications for Fast Slewing," Electronics Product Magazine, p. 54–55, 6/21/1971.

*Primary Examiner*—Rudolph V. Rolinec
*Assistant Examiner*—L. N. Anagnos
*Attorney, Agent, or Firm*—W. H. MacAllister; Lawrence V. Link, Jr.

[57] ABSTRACT

A sensitive pulse detector which in one embodiment incorporates a tunnel diode is disclosed. The tunnel diode prior to the application of a gate pulse of a selected duration during which an input pulse may be received is pre-biased in the absence of the gate pulse so that the current passing therethrough is equal to its peak current, with the diode being maintained in its low voltage state. The application of the gate pulse produces a current bias which reduces the diode current from its peak current value by a known value. Switching to the high voltage state takes place only if, an input current produced in response to an input pulse, raises the diode current above the peak current value. In another embodiment incorporating an amplifier, the latter's offset voltage is automatically compensated for to enable pulse detection independent of the offset voltage. In yet another embodiment, pulse detection is accomplished with a regenerative voltage circuit pre-biased to one of its trigger points.

25 Claims, 12 Drawing Figures

SENSITIVE PULSE THRESHOLD DETECTOR

BACKGROUND OF THE INVENTION

1. Field of the Invention

The present invention generally relates to a pulse threshold detector and, more particularly, to a sensitive circuit for detecting very small signals which exceed a selectable threshold.

2. Description of the Prior Art

There are a number of applications in which it is desired to indicate the presence of very small input pulses which exceed a selected threshold level by generating for each input pulse a large output pulse. Such applications include, though not limited to, receiver circuits of a radar system or a laser ranging system. Herebefore such input pulses have been detected by threshold circuits which incorporate Schmitt trigger circuits or other analog comparators. Generally, the sensitivity of Schmitt trigger circuits and analog comparators is limited, thereby limiting their usefulness to pulse detection at signal levels in the range of several millivolts up to several volts. To detect smaller pulses, amplification is required. Some circuits which eliminate the need for amplification employ pre-biased tunnel diodes.

As is known, the voltage drop across a tunnel diode changes from a low voltage state to a high state when the current flowing across the diode exceeds its peak current value. When used as a threshold detector, the tunnel diode is pre-biased to below its peak current value, so that if the input pulse contributes a current which together with the pre-biased current value exceed the peak current value, the voltage drop across the diode switches to its high state thereby indicating the presence of the input pulse. For example, a 1 microampere ($\mu a$) threshold signal can be detected by pre-biasing a tunnel diode with a peak current value of 1 milliampere ($\mu a$) with a current of 999$\mu a$. However, since the peak current value is not constant, but rather is subject to change due to various factors, including diode temperature variations, the system's sensitivity is limited by how well the pre-bias can be made to track the peak current value so as to maintain a constant threshold setting. Generally, the pre-bias is manually adjusted, a task which is very tedious if high sensitivity without oscillation is to be achieved.

OBJECTS AND SUMMARY OF THE INVENTION

It is a primary object of the present invention to provide a new pulse threshold detector which eliminates or greatly minimizes the disadvantages of prior art detectors.

Another object of the present invention is to provide a sensitive pulse threshold detector in which pulse amplification is not required.

A further object of the invention is to provide a sensitive pulse threshold detector in which manual adjustment tasks are eliminated and in which pre-biasing is provided automatically at the point of optimum performance.

These and other objects of the invention are achieved in one detector embodiment incorporating a tunnel diode. In this embodiment, the arrival of any input pulse to be detected may occur at any point during the duration of a gate pulse which is applied to the detector. In the absence of a gate pulse, the current flowing through the diode is automatically controlled by a control circuit which responds to the voltage drop across the diode to be substantially equal to the peak current value of the diode, irrespective of changes in the peak current value due to temperature or other factors. The current provided by the control circuit may be defined as $I_X$, the current flowing through the diode as $I_D$ and its peak current value $I_P$. In the absence of a gate pulse, after current stabilization is achieved, $I_X = I_D = I_P$, and the diode is effectively maintained in its low voltage state. Any change in the peak current value is automatically compensated for by the control circuit which adjusts $I_X$ to equal the diode's peak current value prior to the application of the gate pulse.

The application of a gate pulse accomplishes two objectives. It causes the control circuit to provide current for the diode at the amplitude existing just prior to the gate pulse which is substantially equal to the peak current value. Thus, during the gate pulse duration $I_X = I_P$. Also, the gate pulse activates a bias circuit which automatically biases the diode current by passing part of the current $I_X$ from flowing through the diode. The bypassed current definable as $I_B$, may be thought of as a bias current. Thus, due to the bias current, $I_D = I_X - I_B = I_P - I_B$, and since $I_D$ is less than $I_P$, the diode remains in its low voltage state.

If during the duration of the gate pulse an input pulse is applied to the detector, the current diode $I_D$ is increased by a factor $I_I$. Thus, during the presence of the input pulse $I_D = I_P - I_B + I_I$. The current $I_I$ is related to the amplitude of the input pulse. As long as $I_I$ is not greater than the bias current, $I_B$, $I_D$ is not greater than $I_P$ and therefore the voltage drop across the diode is low. However, if due to the input pulse amplitude, $I_I$ is greater than $I_B$, $I_D > I_P$, and therefore the diode switches to its high voltage state. Such a diode state, during the presence of a gate pulse, indicates the detection of an input pulse, whose amplitude exceeds the threshold level defined by the bias current. After the gate pulse duration, the control circuit resumes once more automatic control of the diode current, adjusting it to equal $I_P$ in preparation for the arrival of a subsequent gate pulse. The bias current may be held constant during the entire gate pulse duration, or made to vary, thereby varying the detector's sensitivity which increases with decreased bias current.

The novel features of the invention are set forth with particularity in the appended claims. The invention will best be understood from the following description when read in conjunction with the accompanying drawings.

DETAILED DESCRIPTION OF THE PREFERRED EMBODIMENTS

Figure 1:
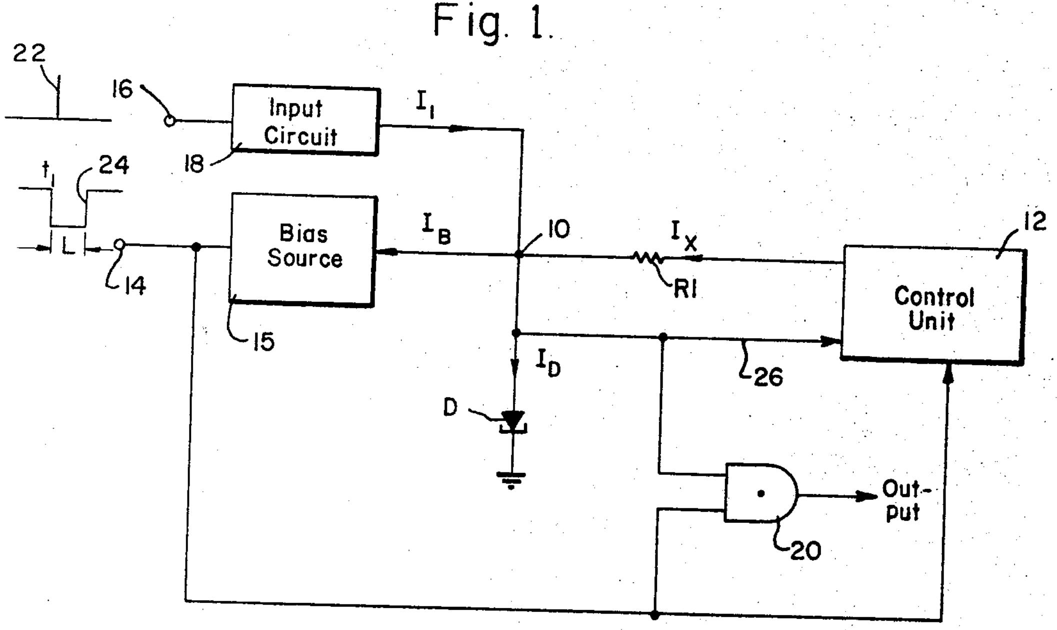
FIG. 1 is a simplified diagram of an embodiment of the detector incorporating a tunnel diode.
Figure 2:
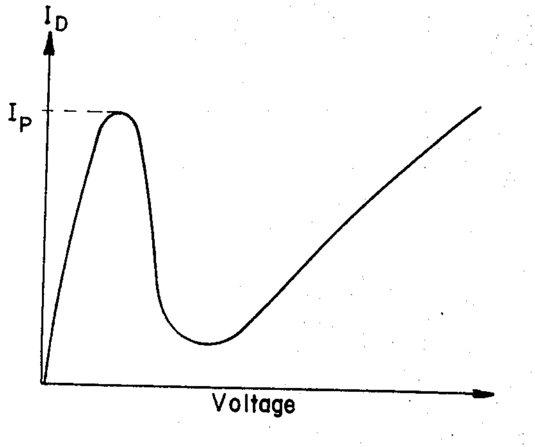
FIG. 2 is a diagram of voltage versus current of a tunnel diode.

Attention is now directed to FIG. 1 which is a simplified block diagram of one detector embodiment of the present invention incorporating a tunnel diode D, shown connected between a junction point 10 and a reference potential, e.g., ground. As is known, the voltage drop across the diode, i.e., the voltage at the anode connected to point 10 with respect to ground, depends on the current flowing through the diode which in FIG. 1 is designated $I_D$. The diode's typical voltage versus current $I_D$ relationship is diagrammed in FIG. 2. As is appreciated, the voltage is low and the diode is assumed to be in its low voltage state as long as $I_D$ is not greater than a peak current value $I_P$. Once $I_D$ exceeds $I_P$, the voltage switches to a high value, which represents the diode's high voltage state.

In accordance with the present invention, the voltage across the diode is sensed by a control circuit 12 which is connected through a resistor R1 to point 10. The control circuit is also connected to a gate terminal 14 which is connected to point 10 through a bias source 15. An input terminal 16 is connected to an input circuit 18 which is in turn connected to point 10. The latter and gate terminal 14 are shown connected to two separate input terminals of AND gate 20.

As a sensitive pulse detector, the function of the detector is to sense the presence of an input pulse 22 at terminal 16 and provide an output only if the amplitude of pulse 22 exceeds a selected threshold. In the present invention, the threshold is controlled by bias source 15 when a gate pulse 24 is applied to gate terminal 14. For explanatory purposes, it is assumed that the leading edge of pulse 24 occurs at $t_1$ and that its duration is L, it being further assumed that pulse 22 occurs only during the period L.

Briefly, the function of control unit 12 is to provide a current $I_X$ which flows to junction point 10, while the function of input circuit 18 is to provide a current $I_I$ which flows to point 10 when input pulse 22 is applied at terminal 16. The amplitude of $I_I$ is directly related to the amplitude of input pulse 22. The function of bias source 15 is to cause a bias current $I_B$ to flow from the point 10 to the source 15 when a gate pulse is applied at terminal 14. For the present, it is assumed that the amplitude of $I_B$ is constant during the entire duration L of pulse 24 and is equal to a value fixed by the amplitude of pulse 24. Point 10 can therefore be viewed as a current summing point which provides the sum of $I_X - I_B + I_I$, which is equal to the currenent $I_D$ flowing to diode D. Thus, $I_D = I_X - {}_{IB} + I_I$.

In the absence of gate pulse 24 and input pulse 22, $I_B = 0$ and $I_I = 0$, and therefore $I_D = I_X$. The control unit 12 operates in two modes. In the absence of the gate pulse 24, it senses the voltage across the diode which is applied thereto via line 26 and controls the current $I_X$ to equal $I_P$ which is the peak current value of D, so that $I_X = I_D = I_P$. The manner in which such control is accomplished will be described hereafter in detail. Briefly, if during power turn-on, $I_X$ is greater than $I_P$, the diode is switched between its two states and unit 12 reduces the amplitude of $I_X$ until it equals $I_P$. On the other hand, if $I_X$ is less than $I_P$, the diode remains in its low voltage state causing unit 12 to increase the amplitude of $I_X$ until it equals $I_P$. Once $I_X$ is adjusted to equal $I_P$, unit 12 automatically maintains $I_X$ to be substantially equal to $I_P$, and the diode remains effectively in its low voltage state. For explanatory purposes, it is assumed that just prior to $t_1$, when gate pulse 24 is applied, $I_X = I_P$.

When the gate pulse is applied, it switches unit 12 to its second mode in which $I_X$ is maintained constant during the entire gate pulse duration L at its amplitude just prior to $t_1$, i.e., at $I_P$. Thus, during the entire gate pulse duration, $I_X = I_P$. When gate pulse 24 is applied, the bias current $I_B$ flows from junction point 10 to source 15. Thus, $I_D = I_X - I_B = I_P - I_B$. Consequently, since the diode current $I_D$ is less than $I_P$, the diode voltage is low. It remains low during the entire gate pulse period unless an input pulse is applied at terminal 16 which causes circuit 18 to provide a current $I_I$ which exceeds $I_B$ so that $I_D$, which equals $I_P - I_B + I_I$ becomes greater than $I_P$. When such an occurrence takes place, AND gate 20 is enabled to provide a true output which indicates the presence of an input pulse whose amplitude exceeds the threshold defined by $I_B$.

It should be stressed that in the present invention prior to the gate pulse, the control unit automatically adjusts the diode current $I_D$ to equal the actual peak current value of the diode just prior to the gate pulse arrival rather than to a fixed peak current value. Thus, any change in $I_P$ due to any reasons, e.g., temperature variations is automatically accounted for. This is done at the point of optimum performance, namely just prior to the arrival of the gate pulse. The latter biases the diode by reducing its current $I_D$ from $I_P$ to $I_P - I_B$. Once biased to a threshold defined by $I_B$, an input pulse is assumed to be detected only if its amplitude is such as to provide a current $I_I$ which is greater than $I_B$.

Clearly, if $I_B$ is constant during the gate pulse period, the detector's sensitivity is constant. For example, assuming that $I_B = 2\mu a$ during the entire period the detector provides an output only if during the period an input pulse is received whose amplitude produces current $I_I$ which is greater than $2\mu a$. If, however, during the gate pulse period, $I_B$ varies, e.g., from $2\mu a$ to $0.2\mu a$, the detector's sensitivity is varied by a factor of 10 since when $I_B = 2\mu a$, an input pulse is detected if its amplitude produces $I_I > 2\mu a$, while when $I_B = 0.2\mu a$, an input pulse 1/10 the amplitude will be detected since the current $I_I$, which is needed for pulse detection is only slightly greater than $0.2\mu a$.

Figure 3:
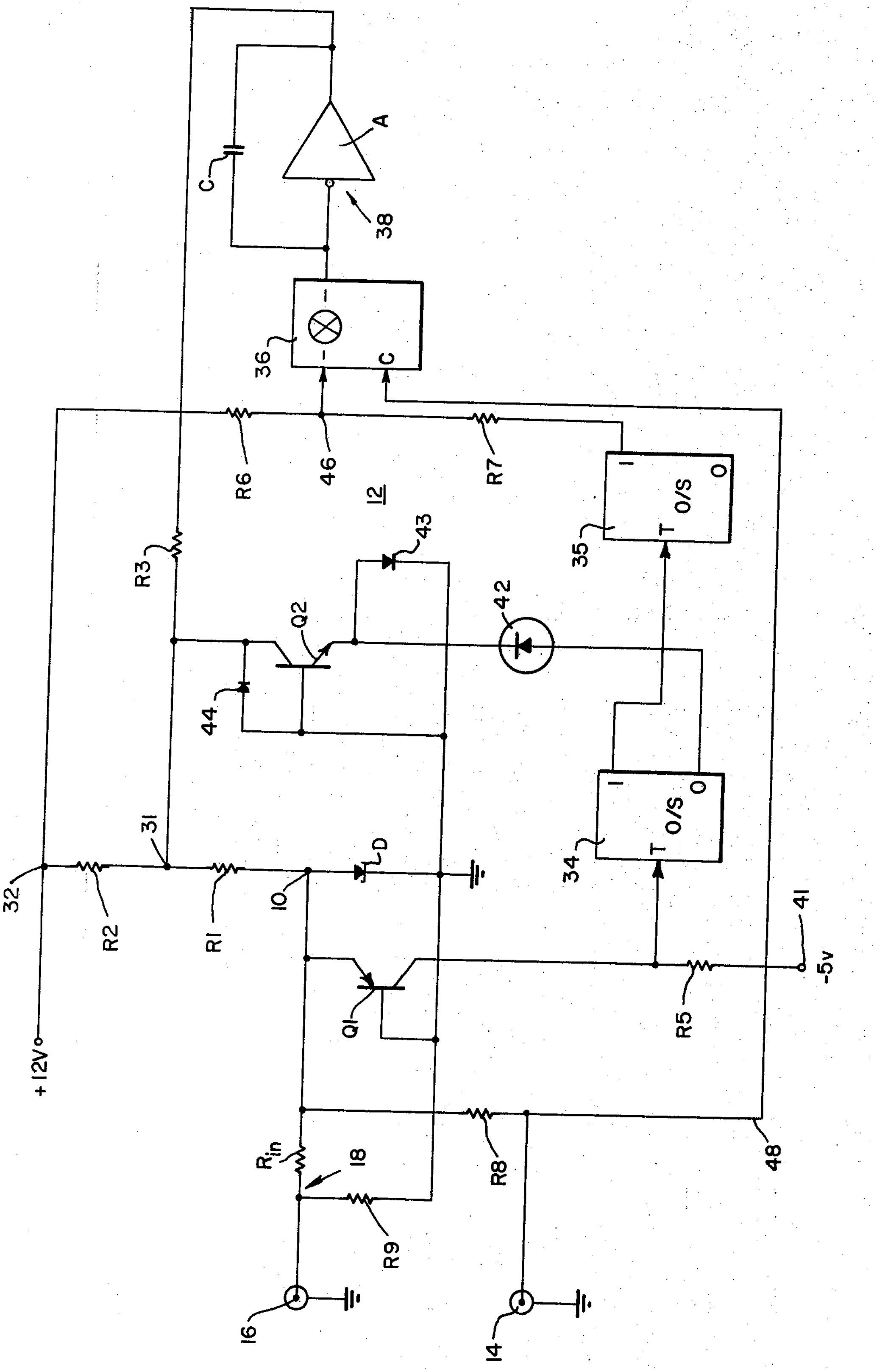
FIG. 3 is a detailed diagram of the embodiment of FIG. 1.

Attention is now directed to FIG. 3 which is a detailed diagram of the detector shown in FIG. 1, wherein like elements are designated by like numerals. The control unit 12 is shown including a resistor R2 connected to one end of R1 at point 31 and at the other end to a terminal 32 at which +12v is assumed to be applied. The unit 12 also includes a PNP transistor Q1, an NPN transistor Q2, a pair of one-shot circuits 34 and 35, a gate 36 and an operational integrator 38 which includes an amplifier A with a feedback capacitor C. The output of integrator 38 is connected to point 31 through a resistor R3. The emitter and base of Q1 are respectively connected to junction point 10 and ground while the collector is connected through a resistor R5 to −5v at terminal 41, and to the input of one-shot 34. The 1 output of one-shot 34 is connected to the input of one-shot 35, while the 0 output of 34 is connected to the emitter of Q2 through a Zener diode 42. The Q2 emitter is also connected to ground through a hot carrier (or Shottky Barrier) diode (HCD) 43, while the collector and base of Q2 are connected respectively to point 10 and ground. A HCD 44 is connected between the Q2 collector and ground. The 1 output of one-shot 35 is connected through series resistors R6 and R7 to +12v, with the junction point of the two resistors, designated by numeral 46, being connected through gate 36 to the input of amplifier A. Gate 36 is connected via enabling line 48 to gate terminal 14.

In FIG. 3, resistor R8, which is connected between the terminal 14 and point 10 represents the bias source 15. Resistor $R_{in}$ connected between terminal 16 and point 10 and resistor R9 connected between terminal 16 and ground, represent the input circuit 18.

The operation of the control circuit 12 in the absence of a gate pulse will now be described. Assuming that when power is first applied to the detector, the current $I_X$ exceeds $I_P$. Since $I_X = I_D$, $I_D > I_P$, and therefore diode D is in its high voltage state. Consequently, Q1 is turned on thereby triggering one-shot 34 to provide a pulse of duration defined as $T_x$, during which a logic 0 state is at the 0 output of 34. This state causes Q2 to conduct. As a result, the current $I_X$ is bypassed to ground. Therefore, the diode current if any, falls below a current level which causes the diode to switch to its low voltage state, turning off Q1. However, Q2 remains conducting for the duration $T_x$ of the pulse from 34. The logic 1 state at the 1 output of one-shot 34 triggers one-shot 35 which provides a pulse of duration $T_y$, during which the 1 output of 35 is at a logic 1 state.

AS seen from FIG. 3, terminal 46 is connected to the input of integrator 38 through gate 36. The latter is closed during the absence of a gate pulse, and therefore the voltage at terminal 46 is directly applied to the input of the amplifier A of the integrator 38. A positive voltage at terminal 46 causes the output of 38 to become more negative at a rate determined by the biasing resistors R6 and R7 and the feedback capacitor C. On the other hand, a negative voltage at terminal 46 results in the integrator's output becoming more positive. Thus, the voltage polarity at terminal 46 affects the output of the integrator. When gate 36 is opened and the terminal 46 is decoupled from the integrators, the latter's output, ignoring leakage, remains constant.

In the present embodiment, when the 1 output of one-shot 35 is at a logic 1, which occurs when the one-shot produces a pulse of period $T_y$, the voltage at terminal 46 is positive, thereby decreasing the output of the integrator. As a result, the current $I_X$, which flows to the diode D decreases. On the other hand, if the 1 output of one-shot 35 is at a logic 0 state, the voltage at terminal 46 is negative, thereby increasing the output of the integrator. Thus, $I_X$ which flows to the diode, increases.

In the present example, when one-shot 34 triggers one-shot 35, during the duration $T_y$ of its output pulse, the output of integrator 38 decreases, thus decreasing $I_X$. At the end of the pulse of one-shot 34, Q2 is turned off. Thus, diode current is no longer bypassed through Q2. If $I_X$ is still greater than $I_P$, diode D switches again to its high voltage state. As a result, Q1 is again turned on, triggering one-shot 34 which in turn triggers one-shot 35. This causes a positive voltage to be applied once more or if $T_y > T_x$, to continue to be applied at terminal 46. It further reduces the output of integrator 38, in turn reducing the amplitude of $I_X$ which flows to the diode, or through Q2 when the latter is turned on. Thus, as long as $I_X > I_P$, Q1 and the one-shot 34 will continue to oscillate, being retriggered each time the one-shot 34 recovers and Q2 is turned off. As a result, the output of the integrator 38 continuously becomes more negative, which causes the amplitude of $I_X$ to decrease until $I_X = I_P$. When $I_X \leq I_P$, the diode D remains in its low state. Thus, Q1 is not turned on and therefore the one-shot's 34 and 35 are not triggered. When the latter is not triggered, the voltage at terminal 46 is negative. Thus, the output of the integrator increases, which causes $I_X$ to increase. When the latter exceeds $I_P$ the retriggering operation is resumed.

Figure 4:
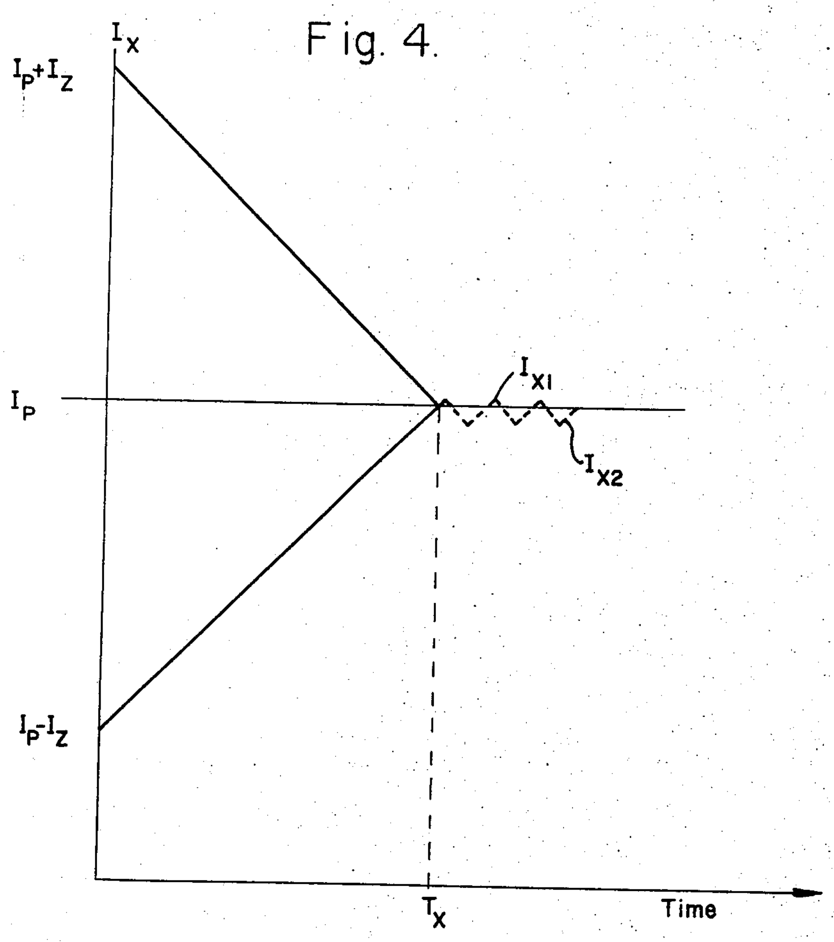
FIGS. 4, 5, and 6 are diagrams useful in explaining additional features of the embodiment shown in FIG. 3.

FIG. 4 illustrates the variation of $I_X$ versus time for two starting conditions, one in which $I_X = I_P + I_Z$. $I_X$ is shown to be equal to $I_P$, at time $t_x$. Thereafter, and before a gate pulse is received, the control circuit 12 controls $I_X$ to be as close as possible to $I_P$. As $I_X$ increases only by an infinitesimal amount above $I_P$ as represented by $I_{X1}$, the diode switches to its high voltage state. In practice $I_{X1} - I_P$ is so small that $I_{X1}$ can be regarded as equal to $I_P$. Once the diode is switched to its high voltage state, one-shot 34 is triggered, in turn triggering one-shot 35 so that during the period of $T_y$ of its pulse, the output of integrator 38 decreases, in turn decreasing $I_X$. At the end of $T_y$, $I_X = I_{X2}$ and the integrator's output rises again increasing $I_X$ to $I_{X1}$, at which time the diode is again switched to its high state. Thus, during this phase, which can be regarded as the stabilization phase, $I_X$ varies between $I_{X1}$ and $I_{X2}$. $I_{X1} - I_{X2}$ represents the change in $I_X$ which occurs as a result of the change in the output of the integrator 38 during the period $T_y$ of each pulse of one-shot 35. In practice, $I_{X1} - I_{X2} = I_P - I_{X2}$ can be minimized so that $I_X$ can be regarded as being continually equal to $I_P$. This is achieved by either decreasing $T_y$ or decreasing the rate of $I_X$ change during $T_y$. In one embodiment actually reduced to practice, $T_x$ is 50ns, $T_y$ is 1$\mu$s and $I_{X1} - I_{X2}$ is 0.5$\mu$a.

It is thus seen, that once the control unit 12 adjusts $I_X$ to equal $I_P$ at time $t_x$, it maintains $I_x$ equal to $I_P$. When the gate pulse is applied, two things take place. Gate 36 is opened and remains open for the duration L of the gate pulse. Thus, the input of integrator 38 does not change during the gate pulse duration. Consequently, $I_X$ remains fixed at $I_P$ for the gate pulse duration. Also, the negative gate pulse at terminal 14 produces a voltage drop across R8. Thus, the bias current $I_B$ flows from point 10 to terminal 14 through R8. Consequently, $I_D = I_X - I_B = I_P - I_B$. In the particular embodiment in which the bias circuit 15 is the single fixed resistor R8, the amplitude of $I_B$ which defines the detector's threshold level is controlled by the amplitude of the gate pulse and the value of R8.

The input current $I_I$ depends on the amplitude of the input pulse applied at input terminal 16. From the foregoing, it should thus be apparent that during the gate pulse period, the diode current $I_D = I_P - I_B$ in the absence of an input pulse, and in the present of an input pulse $I_D = I_P - I_B + I_I$. During the gate pulse period, $I_D$ can be greater than $I_P$, thereby causing the diode to switch to its high voltage state, only if $I_I$ is greater than $I_B$. This occurs only if the input pulse has an amplitude greater than a threshold level defined by $I_B$. When this occurs, gate 20 (see FIG. 1) is enabled to indicate the presence of an input pulse which exceeds the threshold level.

It should be pointed out that $I_I$ need exceed $I_B$ only by the infinitesimal amount needed for $I_D$ to exceed $I_P$ so that the diode switches to its high state. Otherwise, the diode remains in its low voltage state during the entire gate pulse duration and no output pulse is produced by the detector, thereby indicating the absence of an input pulse of an amplitude above the selected threshold level during the gate pulse duration. It should further be pointed out that if during the gate pulse period the diode switches to the high state Q1, Q2 and one-shot 34 reset it to the low state so that additional sensing can take place on multiple pulses during a single gate pulse duration.

From the foregoing, it is thus seen that in the previously described embodiment prior to the gate pulse, the diode is pre-biased by the current $I_X$ to equal $I_P$. Any change in the latter is automatically compensated for by a change in $I_X$. Thus, at a point of optimum performance, i.e., just prior to the gate pulse $I_D = I_X = I_P$. The gate pulse when received, biases the diode current by $I_B$ so that $I_D = I_P - I_B$. The bias current $I_B$ defines the detector's threshold. For an input pulse to be detected, an input current $I_I$ must be produced which exceeds $I_B$ by an infinitesimal amount to switch the diode to its high state. In practice, $I_B$ can be made as small as desirable, e.g., less than 1$\mu$a thereby enabling the detection of extremely small pulses.

Figure 5:
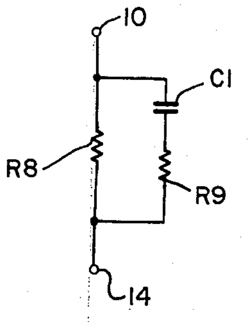
Figure 6:
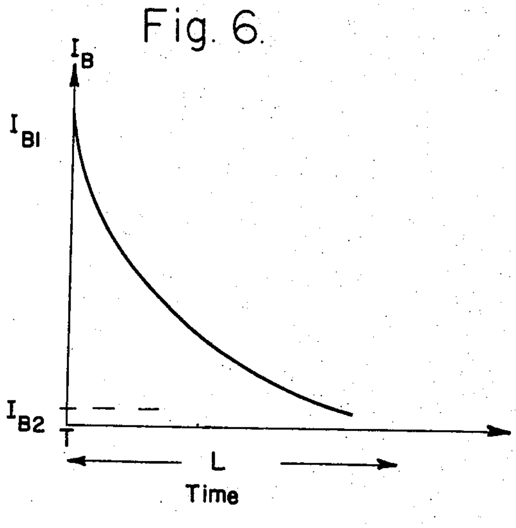

In some applications, such as in a laser range finder system, it may be desirable to vary the detector's sensitivity during the gate pulse from a low level at the start of the gate pulse to a high level at the end of the pulse. Gating may start at the start of the laser pulse transmission time and end with maximum range of the laser receiver. Variable detector sensitivity may be achieved by connecting a capacitor C1 (see FIG. 5) which is connected in series with a resistor R9 across R8. In such a case, the bias current will decrease as shown in FIG. 6 from an initial maximum value of $I_{B1}$, at time $t_1$ when the gate pulse is applied, to $I_{B2}$ at the end of the gate pulse period. From the foregoing, it should thus be apparent that the required amplitude of the input signal needed to produce $I_I$ which is greater than $I_B$ decreases during the gate pulse period. Thus, at the start of the gate pulse period L, a large input pulse is needed to trigger the detector while a much smaller input pulse is needed toward the end of the gate pulse period.

The tunnel diode in the foregoing described embodiment can be thought of as a regenerative current circuit with a double valued current over a finite voltage range. The diode will remain in the low voltage state as long as $I_D$ is not greater than $I_P$. When $I_P$ is exceeded, the diode switches to its high voltage state. As is known, a tunnel diode remains in the high voltage state even though the current may drop below $I_P$. However, once the $I_D$ falls below a current value defined by the diode's load line (not shown), the diode switches to its low voltage state. In the present invention, switching from the high to the low voltage state is done by bypassing the current through Q2 so that effectively $I_D$ drops to zero. In the described embodiment, the diode is prebiased or stabilized so that $I_D$ is at or very near $I_P$ which is the trigger point for switching the diode to the high voltage state. The bias current $I_B$ biases the diode current below $I_P$, thereby moving the diode current away from the trigger point. The input current $I_I$ however raises the current to the trigger point which when exceeded causes the diode to switch to its high state.

Although herebefore the invention has been described in connection with an embodiment incorporating a tunnel diode, the teachings of the invention are not intended to be limited thereto. Generally stated, the invention is directed to automatically providing pre-biasing to a comparing-type device at the point of optimum performance, namely before an input pulse is received, so that when a bias signal is applied, which defines a threshold which the input pulse has to exceed, only when this threshold is exceeded is an indication of the presence of the input pulse produced.

Figure 7:
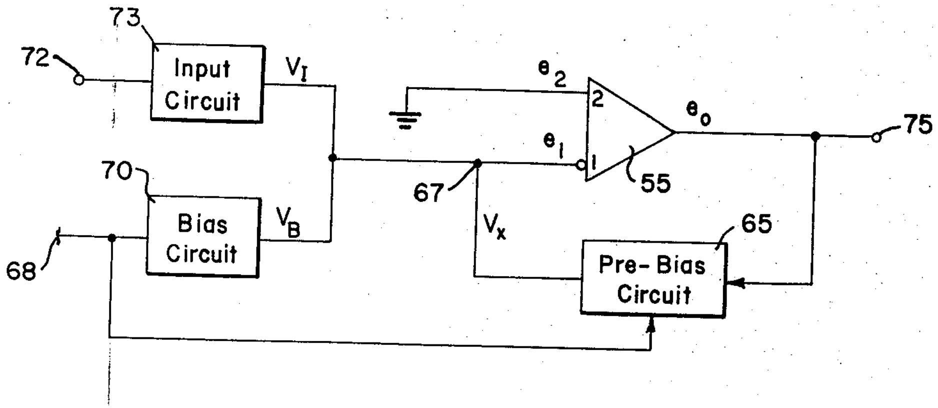
FIG. 7 is a simplified diagram of an embodiment of the detector incorporating an operational amplifier.

Attention is now directed to FIG. 7 which is a simplified diagram of an embodiment of the present invention incorporating an operational amplifier 55 which is used as the comparing device. As used herein, the term operational amplifier is intended to include any circuit or device whose output voltage (or current) varies linearly over a selected output region as a function of the voltage (or current) difference between two inputs or one of which may be at a fixed reference voltage. Thus, broadly, the term operational amplifier is intended to include, in addition to conventional operational amplifiers, differential amplifiers, video amplifiers, single ended amplifiers, voltage or current comparators, and single transistor amplifiers.

AS is known, in an operational amplifier, the output voltage depends on the voltage difference between its two inputs. In FIG. 7, the output voltage is designated by $e_0$ and the voltages at the inverting input 1 and non-inverting input 2 are designated by $e_1$ and $e_2$, respectively. In FIG. 7, the latter is assumed to be at ground or zero potential. In an "ideal" inverting operational amplifier, the output voltage $e_0$ is at a midpoint level between upper and lower saturation levels when $e_1 - e_2 = 0$.

Figure 8:
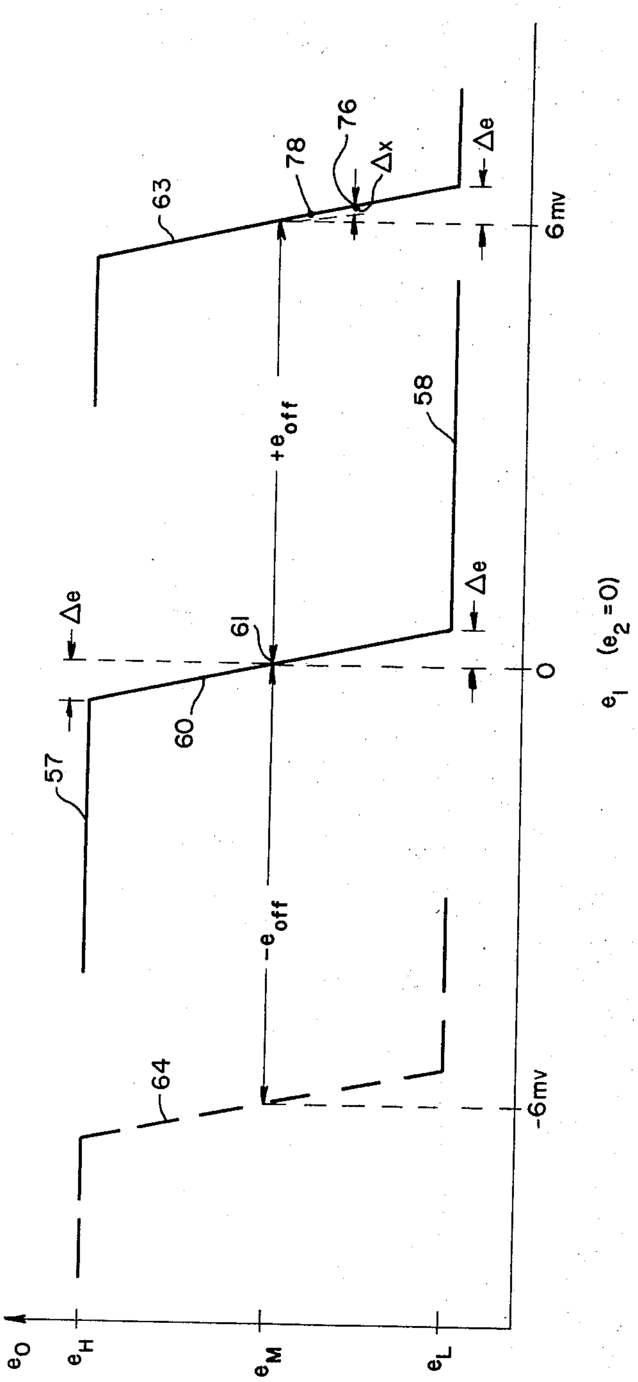

In FIG. 8, which is a diagram of $e_0$ versus $e_1$, (where $e_2 = 0$), lines 57 and 58 designate the amplifier's upper and lower saturation levels and line 60 represents the linear region of the ideal amplifier's output when the difference between $e_1$ and $e_2$ is less than that required to drive the amplifier to saturation at either level. This voltage difference, designated $\Delta e$ may be made quite small by increasing the amplifier's gain. The amplitude of the upper saturation level 57, the lower saturation level and the midpoint 51 of the linear region 60 are designated as $e_H$, $e_L$ and $e_M$, respectively. Line 60 represents the linear region of the output of an ideal amplifier since its midpoint 61 is assumed to occur when $e_1 = 0 = e_2$, i.e., when the difference between the two inputs is zero.

In practice, nearly every operational amplifier exhibits an offset value or voltage as a result of which its operative characteristics deviate from that of an ideal amplifier. Manufacturers of operational amplifiers designate the offset value of each amplifier type. Generally, any amplifier of a particular type may have an offset value of plus or minus (±) the designated offset value. Also, the offset value of any particular amplifier is not constant but rather is subject to change due to changing environmental conditions, e.g., temperature changes. The offset value is generally defined as the voltage difference between the amplifier's inputs (which is other than zero) for which the output voltage is at the midpoint between its saturation levels.

Offset values are typically several millivolts. For example, in FIG. 8, line 63 designates the linear region of an operational amplifier with an offset voltage designated $+e_{off} = +6$mv. In such an amplifier (assuming $e_2 = 0$), the output of the amplifier is at the midpoint of the linear region only when $e_1 = 6$mv, rather than at 0. Thus, in such an amplifier, switching occurs when $e_1 = +6$mv $\pm \Delta e$. On the other hand, line 64 represents the linear region of an amplifier with an offset of $e_{off} = -6$mv, in which switching occurs when $e_1 = -6$mv $\pm \Delta e$. It is the offset voltage property of operational amplifiers that herebefore has prevented their use to detect small signals with amplitudes which are less than there offset voltages. In accordance with the present invention, the offset voltage of amplifier 55, irrespective of its value, is automatically compensated for so that it can be used to detect input pulses with amplitudes which are much smaller than the amplifier's offset value.

In accordance with the present invention, the effect of the offset voltage of the amplifier 55, which as previously pointed out is variable due to changing operating conditions, is automatically compensated for by pre-biasing the amplifier input with a pre-biasing voltage, before an input signal to be detected is received, so that the output voltage of the amplifier is at a selected level in its linear region. Prior to receiving the input signal to be detected, a gate pulse of a selected duration is received. It, like in the previous embodiment which includes the tunnel diode, performs two functions. During the gate pulse duration, the pre-bias voltage is held during the entire gate pulse duration at its amplitude just prior to the gate pulse. Also, the gate pulse causes a bias voltage $V_B$ of a selected level to be applied to the amplifier input. The bias voltage which may be constant or variable during the gate pulse duration represents a threshold voltage. Depending on its amplitude, polarity and the amplifier input to which the bias voltage $V_B$ is applied prior to receiving an input signal, the bias voltage causes the output voltage to shift from its previous selected level in the linear region.

Assuming that due to the bias voltage, $e_0$ decreases as a result of $V_B$ when an input signal is received, an input voltage $V_I$ related to the input signal amplitude is applied. $V_I$ is applied to the amplifier input so as to shift the output $e_0$ back toward its selected level. When the amplitude of $V_I$ is exactly equal and of opposite polarity to $V_B$, $e_0$ returns to the selected level. Only if the amplitude of $V_I$ exceeds the amplitude of $V_B$ does $e_0$ increase above the selected level. By making $\Delta e$ very small, e.g., 1 mv and assuming that the selected level of $e_0$ is the midpoint, a difference of 1 mv between $V_I$ and $V_B$ is sufficient to drive the amplifier to its upper saturation level $e_H$. This level when produced indicates the presence of an input signal exceeding (by at least $\Delta e$) the threshold level defined by $V_B$.

In practice, any output voltage level spaced from the selected level may be chosen to indicate the presence of an input signal whose amplitude exceeds $V_B$. As shown in FIG. 7, the output $e_0$ of amplifier 55 is supplied to a pre-bias circuit 65 whose output is connected to a voltage summing point 67 which is connected to the inverting input 1. Ignoring for a moment the rest of the circuitry, in the absence of a gate pulse at gate terminal 68, the function of circuit 65 is to apply a pre-bias voltage $V_X$ to terminal 1 through summing point 67 so that the output $e_0$ is at a selected level within the linear region of the amplifier. The selected level need not be the midpoint level $e_M$ although for explanatory purposes, it will be helpful to assume that it is. Assuming a positive offset voltage, $V_X$ is automatically adjusted to be effectively equal to the amplifier's existing offset voltage. If $V_X$, which is supplied by circuit 65 is less than the offset voltage, the output voltage $e_0$ is above the midpoint level (see line 63 in FIG. 8). Consequently, circuit 65 increases $V_X$ until it equals the offset voltage which occurs when $e_0$ is at midpoint. On the other hand, if $V_X$ is greater than the offset voltage, the output voltage $e_0$ is below the midpoint, causing circuit 65 to reduce $V_X$.

When a gate pulse is applied at terminal 68, the circuit 65 holds $V_X$ at its level just prior to the gate pulse application during the entire gate pulse duration. Thus, during the gate pulse period, circuit 65 supplies $V_X$ which is equal to the offset voltage of the amplifier at the start of the gate pulse. The gate pulse also activates bias circuit 70 to apply the bias voltage $V_B$ to the inverting 1 input of the amplifier. Assuming $V_B$ to be of a positive polarity and equal to 5mv and further assuming $\Delta e$ to be 1 mv when $V_B$ is applied it drives the amplifier output to its lower saturation level $e_L$.

During the gate pulse period, if any input signal received at terminal 72 activates an input circuit 73 to provide an input voltage $V_I$ which in FIG. 7 is shown applied to summing point 67. In such an arrangement with $V_B$ having a positive polarity, the polarity of $V_I$ is negative and its amplitude is related to the input signal amplitude. In the particular example, as long as the amplitude of $V_I$ is not greater than 5mv, the output $e_0$ will not exceed its midpoint level $e_M$. If, however, the amplitude of $V_I$ exceeds 6mv, it will drive the amplifier to its upper saturation level $e_H$ (since $\Delta e$ is assumed to be equal to 1 mv). In the particular example, it is assumed that when the output $e_0$ is at its saturation level $e_H$, it indicates at output terminal 75 the presence of an input signal. It is thus seen that for such presence to be indicated $V_I$ produced as a function of the input signal has to exceed the threshold voltage $V_B$ by $\Delta e$, and is independent of the amplifier's actual offset voltage at the time of detection.

As previously indicated, any output level, rather than the midpoint level $e_M$ along the linear region 63, may be selected as the output of $e_0$ prior to the application of the gate pulse, such as the level indicated by point 76 which is below the midpoing level $e_M$. Also, any level, such as that indicated by point 78, along the linear region, which when exceeded, indicates the presence of an input signal, may be selected. In such a case, the presence of an input signal is indicated when $V_I$ exceeds $V_B$ by a minimal voltage necessary to raise the output voltage $e_0$ from the level indicated by point 76 to or above the level indicated by point 78. The minimal voltage is designated in FIG. 8 by $\Delta X$. Since in practice $\Delta X$ depends on the difference between the levels designated by points 76 and 78, and the gain of the operational amplifier and is generally very small as compared with $V_B$, it can be ignored. Thus, it can be stated that herein an input signal is assumed to be detected whenever the amplitude of $V_I$ exceeds the $V_B$ amplitude.

Figure 9:
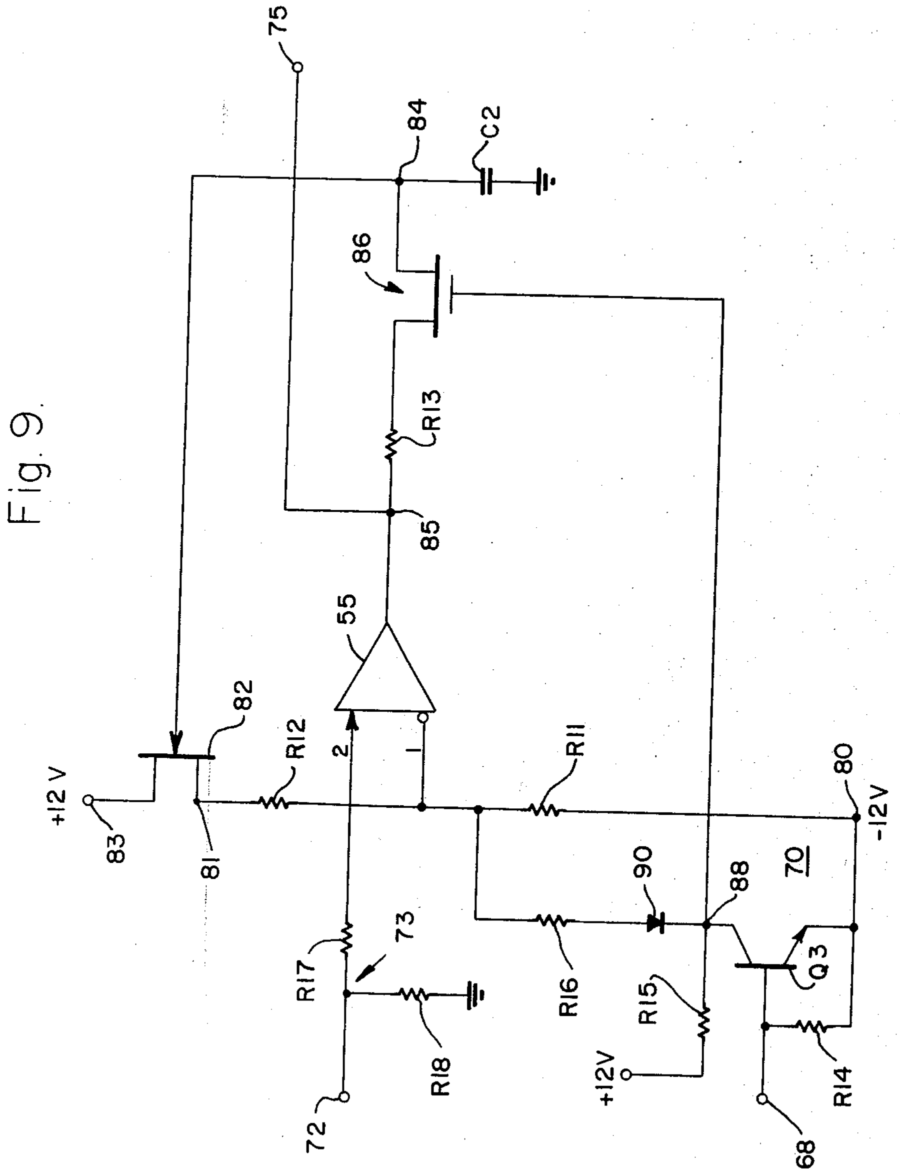

Attention is now directed to FIG. 9 which is a detailed diagram of an embodiment incorporating operational amplifier 55. In this embodiment, the bias voltage with a negative polarity is applied to the inverting input 1 while the input voltage $V_I$ is applied to the non-inverting input 2. Also, in this embodiment, the input signal is detected only if $V_I$ is of a negative polarity and its amplitude exceeds the $V_B$ amplitude. In FIG. 9, the inverting input 1 is shown connected through a resistor R11 to a terminal 80 at which −12v is applied and through a resistor R12 to terminal 81 to which the source (S) electrode of a voltage follower FET 82 is connected. The drain (D) electrode of FET 82 is connected to terminal 82 at which +12v is applied. The gate (G) electrode of FET 82 is connected at terminal 84 to a capacitor C2 which is connected at one end to ground. Thus, the voltage at the source electrode of FET 82 follows the voltage across the capacitor. The output terminal 85 of the amplifier is connected to the detector output terminal 75 and through a resistor R13 to an FET 86 which is also connected to terminal 84 and whose gate electrode is connected to a terminal 88, which forms parts of the bias circuit 70.

Circuit 70 is shown comprising a transistor Q3 whose base is connected to gate terminal 68 and through resistor R14 to its emitter which is connected to −12v at terminal 80. The Q3 collector is connected at terminal 88 to a resistor R15 which is also connected to +12v and to the cathode of a diode 90. The anode of the diode is connected through a resistor R16 to the inverting input 1. Thus, resistor R16, diode 90 and the collector-to-emitter path of Q3 are connected in series across R11. Q3 is off except during the gate pulse period. The input circuit 73 comprises resistors R17 and R18, the former being connected between input terminal 72 and non-inverting input 2 and the latter between terminal 72, and ground. Resistor R18 is quite small so that in the absence of an input signal at terminal 72 input terminal 2 is effectively at ground.

In the absence of a gate pulse at terminal 68, Q3 is off and therefore the resistance between terminal 1 and terminal 80 is only the resistance of R11. Since the input signal is only expected during the period of the gate pulse in the absence of the latter, non-inverting terminal 2 is at ground. Also, in the absence of a gate pulse FET 86 is turned on and therefore capacitor C2 is charged up through R13 and FET 86 to the output voltage $e_0$. Consequently, the voltage at terminal 81 is controlled by the output voltage $e_0$.

Figure 10:
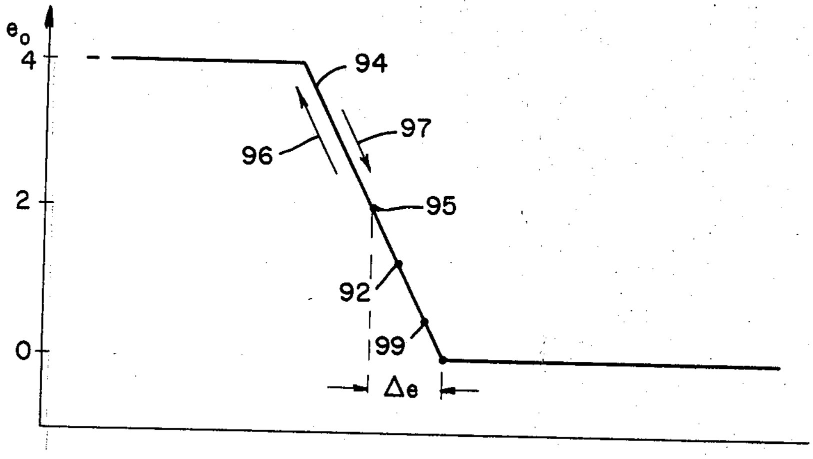
FIGS. 8, 9, and 10 are diagrams useful in explaining the operation of the embodiment with the operational amplifier, with FIG. 9 being a detailed diagram thereof.

With terminal 80 at −12v, the values of R11 and R12 are chosen to stabilize the output voltage $e_0$ of amplifier 55 at a selected level within its linear region irrespective of the amplifier's offset voltage or any changes therein. Assuming that the amplifier's lower and upper saturation levels are ground, i.e., 0v and 4v, respectively, for a linear region of 4 volts any level within this region may be selected. For example, 1.2v represented by point 92 on line 94 in FIG. 10 is assumed to be selected. The midpoint level of 2v is represented by point 95. With terminal 80 at −12v, R11 and R12 are chosen so that the voltage $e_1$ is at ground. The gate to source voltage $V_{gs}$ of FET 82 is assumed to be zero. With $$R11 = 10 \text{ (in K}\Omega)$$

and representing the resistance of R12 in KΩ as $R_{12}$ $$12 + 1.2/10 + R_{12} = 1.2 - 0/R_{12}$$

Therefore, $R_{12} = 1$.

Assuming that the offset voltage is zero with both terminals 1 and 2 at ground, ($e_1 = e_2 = 0$), the output of the amplifier tries to move toward the midpoint level of 2.0v. However, any small increase of the output voltage about 1.2v increases the voltage at the inverting input 1. Due to the large gain of the operational amplifier 55 even a very small increase in $e_1$ causes a significant change in the output voltage. For example, assuming that $\Delta e = 2$mv, only an increase of 0.8mv in $e_1$ is necessary to lower the voltage $e_0$ from 2v to 1.2v. With R11 and R12, 10KΩ and 1KΩ, respectively an increase in the output voltage from 1.2v of 0.88mv is sufficient to increase the voltage $e_1$ by 0.8mv. It is thus seen that the output voltage $e_0$ remains effectively at 1.2v. If for any reason the offset voltage changes from zero, it is automatically adjusted and $e_0$ remains effectively at 1.2v. For example, assuming that the offset voltage rises to (or is) +4mv, $e_0$ rises by 4.4mv from 1.2v to 1.2044v to provide the required offset voltage. Again, since 4.4mv as compared with 1.2v is insignificant, it can be stated that $e_0$ remains effectively at 1.2v during the stabilization phase prior to the arrival of the gate pulse. That is, $e_0$ is maintained at the selected level in its linear region.

When the gate pulse is applied at terminal 68, Q3 is turned on and it remains on during the entire gate pulse duration. As a result, FET 86 is turned off, thereby decoupling the amplifier output terminal 85 from capacitor C2. Consequently, the voltage across the latter remains constant and therefore the voltage at terminal 81 does not change during the gate pulse duration. As a result, the bias voltage, represented by the voltage at terminal 81, is unchanged. Also, when Q3 is turned on and ignoring the resistance across diode 90 and the collector-to-emitter path of Q3, R16 is effectively connected in parallel across R11. The value of R16 is chosen so that the voltage at the inverting terminal 1, i.e., $e_1$ drops from its voltage just prior to the application of the gate pulse by a selected value, defined as $V_B$. Since the voltage at the inverting terminal 1 drops, the output voltage $e_0$ rises.

Depending on the amplitude of $V_B$, $e_1$ may remain in its linear region or become saturated at its higher level of $e_H = 4$v. The rise of $e_0$ is represented by arrow 96 in FIG. 10. The output voltage $e_0$ does not change from the level to which it is driven when $V_B$ is applied until an input signal is applied at terminal 72. When applied, a voltage $V_I$ related to the input signal amplitude is applied to the non-inverting terminal 2. In the particular example, the polarity of the input signal and that of $V_I$ is assumed to be negative. Consequently, $e_1 - e_2$ increases and therefore $e_0$ decreases. The direction of change of $e_0$ as a function of $V_I$ is represented by arrow 97.

If the amplitude of $V_I$ is not greater than the amplitude of $V_B$, $e_0$ does not fall below 1.2v. If, however, the amplitude of $V_I$ exceeds the $V_B$ amplitude, $e_0$ will be lower than 1.2v. In the particular example in which $\Delta e = 2$mv. If $V_I$ exceeds $V_B$ by approximately 1.2mv, $e_0$ saturates at its lower level of 0 volt. Such an output level can be used to indicate the presence of an input signal. In practice, any level in the linear region below 1.2v such as that represented by point 99 may be selected to indicate the presence of the input signal. The selected level however should be sufficiently spaced from 1.2v to insure that it is not responsive to $e_0 \geq 1.2$v.

From the foregoing, it should thus be apparent that herein by eliminating the effect of the offset voltage any signal can be detected when producing a voltage $V_I$ which exceeds $V_B$ by a minimal amplitude, which can be neglected or regarded as part of $V_B$. Since $V_B$ can be made quite small, any small signal can be detected.

This is not the case in the prior art in which due to the offset voltage which is generally in the range of several millivolts and which may be of either positive or negative polarity, only signals which exceed a bias voltage by more than twice the maximum possible offset voltage can be detected with any degree of accuracy.

In the foregoing described embodiment, advantage is taken of the linear region of the operational amplifier to stabilize the detector at a level in this linear region. The teachings of the invention are equally applicable to a regenerative voltage circuit which can be thought of as having a double valued output $e_0$ over a known region of the input $e_{in}$, as diagrammed in FIG. 11. The input $e_{in}$ is the difference between $e_1$ and $e_2$, where $e_1$ is the voltage at an inverting input terminal 1 and $e_2$ is the voltage at a noninverting input terminal 2, of an amplifier 100 shown in FIG. 12. The regenerative property is realized by the positive feedback via resistor R20. In the regenerative voltage, circuit 100 $e_0$ is at one level, e.g., high level 102 as long as $e_{in}$ does not exceed a trigger level or point $e_f$. When this point is exceeded, it causes the output to switch to the lower level 103. Once switched, $e_0$ remains at this level until $e_{in}$ falls below a trigger level or point $e_g$, which is less than $e_f$, when switching to the upper level takes place. Between $e_g$ and $e_f$, the output $e_0$ depends on $e_{in}$ and its present state or level.

In accordance with the present invention, the circuit 100 is stabilized at one of the trigger points, e.g., $e_f$ prior to the application of the gate pulse. Therein $e_2$ is controlled so that $e_1 - e_2 = e_f$, and $e_0$ is at its upper level 102. Then the gate pulse applies a bias voltage $V_B$ which lowers $e_2$ by exactly $V_B$. When the input signal is received, $e_0$ switches to the lower level 103 only if $V_I$, produced in response to the input signal, exceeds $V_B$. Otherwise $e_0$ remains at the upper level 102.

Figure 11:
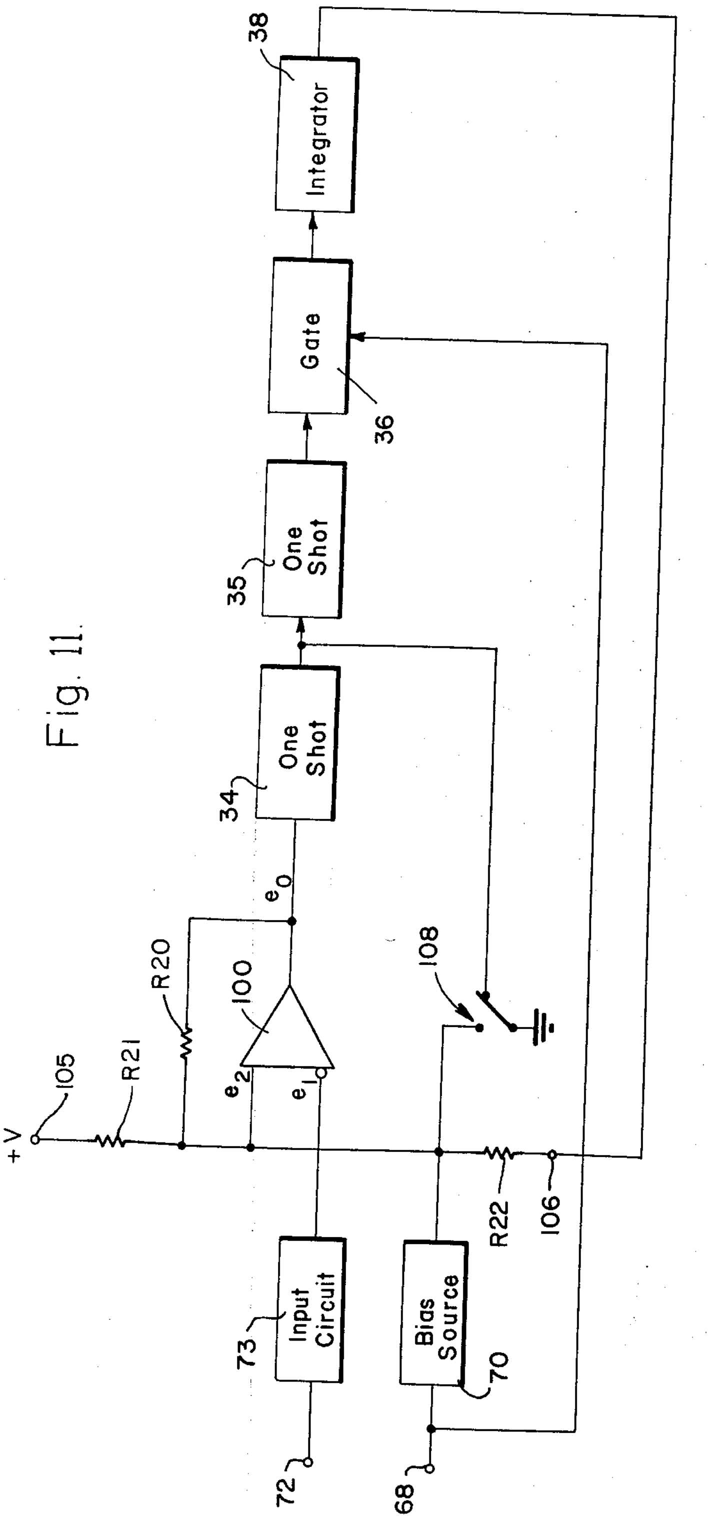
FIG. 11 is a diagram of an embodiment of the detector incorporating a regenerative voltage circuit.

As seen from FIG. 11, the non-inverting terminal 2 is connected through a resistor R21 to a terminal 105 at which +v is applied, and through a resistor R22 to a terminal 106. The latter is the output terminal of voltage integrator 38, similar to that shown in FIG. 3. Similarly, one-shots 34 and 35, and gate 36 perform functions similar to those of corresponding circuits in FIG. 3. Briefly, assuming that circuit 100 is stabilized at $e_f$ if $e_{in} > e_f$, and $e_0$ is at the lower level, one-shot 34 is triggered. It in turn triggers one-shot 35, and since in the absence of a gate pulse gate 36 is closed, during the pulse of one-shot 35 the output of integrator 38 rises raising $e_2$. During the absence of the pulse from one-shot 35, the output of integrator 38 decreases thereby lowering $e_2$. During the pulse of one-shot 34, terminal 2 is shorted to ground via switch 108. Thus, circuit 100 is driven to its high level. At the end of the pulse from one-shot 34, if $e_{in}$ is still greater than $e_f$, the process is repeated until $e_2$ is pre-biased so that $e_1 - e_2 = e_f$.

When the gate pulse is received, the integrator's output remains constant during the gate pulse duration since gate 36 is open. Thus, the prebias voltage at $e_2$ is constant. The bias source 70 biases $e_2$ by $V_B$, e.g., increases $e_2$ by $V_B$. When an input signal is applied, input circuit 73 provides $V_I$ to inverting terminal 1. In the present example, $V_I$ is of a positive polarity and therefore $e_1$ is increased. As long as $V_I \leq V_B$, $e_{in}$ is not greater than $e_f$ and therefore $e_0$ remains at the high level. However, if $V_I > _{VB}$, $e_{in}$ exceeds $e_f$ and therefore $e_0$ switches to the lower level, indicating the presence of the input signal.

Figure 12:
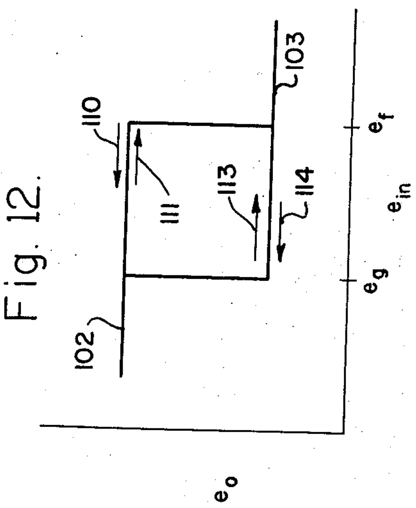
FIG. 12 is an output voltage versus input voltage diagram of a regenerative voltage circuit.

It should be apparent that if desired, the circuit may be stabilized at trigger point $e_g$. In such an embodiment, during stabilization $e_2$ would be decreased until $e_1 - e_2 = e_g$, and both $V_B$ and $V_I$ would be of a negative polarity. In such an embodiment, level 102 would indicate the presence of an input signal. The direction of change of $e_{in}$ when $e_f$ is used as the stabilization point due to $V_B$ and $V_I$ are represented in FIG. 12 by arrows 110 and 111 respectively, while arrows 113 and 114 designate the direction of change when trigger point $e_g$ is chosen for stabilization.

From the foregoing, it is thus seen that the last described embodiment is similar to the embodiment incorporating the tunnel diode, except that in the former a regenerative voltage circuit is employed rather than the tunnel diode which is effectively a regenerative current circuit. Also, in the regenerative voltage circuit, either one of two trigger points may be selected for stabilization, while in the tunnel diode the peak current is selected as the trigger point.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A signal detector comprising:

first means having input means which comprise first and second input terminals for providing an output voltage at a level which is a function of the voltage difference between said input terminals;

a gate terminal at which a gate pulse of a selected duration is applicable;

control means coupled to said first means and to said gate terminal for applying during the absence of a gate pulse a prebias voltage to said input means as a function of the output voltage of said first means to maintain the output voltage substantially constant at a selected level and for applying said prebias voltage to said input means during the duration of said gate pulse at the same level at which the prebias voltage was applied at the start of said gate pulse;

second means for applying a bias voltage to said input means during said gate pulse period; and third means responsive to an input signal for applying an input voltage, which is related to the input signal amplitude, to said input means, whereby the output voltage of said first means deviates in a selected direction from said selected level by at least a selected first factor only when the amplitude of said input voltage exceeds the bias voltage amplitude by a selected second factor, which is independent of the amplitude of the prebias voltage applied to said input means during the gate pulse duration.

2. A signal detector as recited in claim 1 wherein said control means include voltage storage means for storing a voltage at an amplitude related to the amplitude of the output voltage of said first means during the absence of said gate pulse and for retaining the voltage stored therein related to the amplitude of the output voltage of said first means just prior to said gate pulse during the entire gate pulse duration; and means coupled to said voltage storage means for controlling the prebias voltage amplitude as a function of the voltage amplitude stored in said voltage storage means.

3. A signal detector as recited in claim 2 wherein said second means include means for maintaining the bias voltage amplitude constant during the gate pulse duration.

4. A signal detector as recited in claim 2 wherein said second means comprise means for varying the bias voltage amplitude during the gate pulse duration.

5. A signal detector comprising:

am amplifier of the type having first and second input terminals defining amplifier input means and an output terminal for providing at said output terminal an output voltage at an amplitude which is a function of the amplitude difference of the voltages at said first and second input terminals, said output voltage amplitude varying linearly between a first amplitude and a second lower amplitude;

gate means including a gate terminal at which a gate pulse of a selected duration is applied for applying a bias voltage, definable as $V_B$, to said amplifier input means during said gate pulse duration;

circuit input means including a circuit input terminal at which an input signal is applied during said gate pulse period for applying an input voltage, definable as $V_I$, to said amplifier input means, the amplitude of $V_I$ being a function of the input signal amplitude; and control means coupled to said amplifier and to said gate means for applying during the absence of a gate pulse a prebias voltage to said amplifier input means at an amplitude which is a function of the amplitude of the amplifier output voltage so as to maintain the output voltage of said amplifier substantially constant at a selected amplitude in its linear region, and for applying during the gate pulse period said prebias voltage to said amplifier input means at a constant amplitude equal to the prebias voltage amplitude applied to said amplifier input means at the start of said gate pulse period, whereby when said bias voltage $V_B$ and said input voltage $V_I$ are applied to said amplifier input means, the output voltage amplitude deviates in a given direction from said selected amplitude by more than a selected first factor only when the amplitude difference between $V_B$ and $V_I$ is not less than a known second factor.

6. A signal detector as recited in claim 5 wherein said gate means include means for maintaining said bias voltage amplitude constant during the gate pulse duration.

7. A signal detector as recited in claim 5 wherein said gate means include means for varying the bias voltage amplitude during the gate pulse duration.

8. A signal detector as recited in claim 5 wherein said amplifier with said first and second input terminals being the inverting and non-inverting input terminals of said operational amplifier, which is characterized by a varying offset voltage representing the voltage difference between said input terminals required to maintain the output voltage substantially constant at said selected level under varying operating conditions of said operational amplifier, and said control means include means for automatically applying said prebias voltage to said input means at an amplitude corresponding to the amplitude of said offset voltage as a function of the output voltage amplitude so as to maintain said output voltage at said selected amplitude during the absence of said gate pulse.

9. A signal detector as recited in claim 8 wherein said gate means include means for maintaining the amplitude of said bias voltage substantially constant during said gate pulse duration.

10. A signal detector as recited in claim 8 wherein said gate means include means for varying the bias voltage amplitude during the gate pulse duration.

11. In combination with an amplifier of the type including a pair of input terminals, defining amplifier input means, and an output terminal at which an output voltage is produced which is a function of the voltage difference between said input terminals, said output voltage varying linearly in a linear region between an upper saturation level and a lower saturation level, said amplifier being characterized by a varying offset voltage definable as $V_{off}$ which represents the required voltage difference between said input terminals needed to maintain the output voltage at the same level in its linear region under different operating conditions, the arrangement comprising:

gate means including a gate terminal at which a gate pulse of a selected duration is applied for applying a bias voltage definable as $V_B$ to said amplifier input means;

control means coupled to said amplifier and to said gate means for providing a variable prebias voltage to said amplifier input means as a function of the amplifier output voltage during the absence of said gate pulse so as to maintain said output voltage at a selected substantially constant level in its linear region, and for applying said prebias voltage to said amplifier input means during the gate pulse duration at a level which is constant and equal to the prebias voltage at the start of said gate pulse; and circuit means including a circuit input terminal at which an input signal is applied during the gate pulse duration for applying an input voltage definable as $V_I$ to said amplifier input means, whereby during the gate pulse duration, the deviation of the output voltage from said selected substantially constant level is a function of the difference between $V_B$ and $V_I$ and is substantially independent of said offset voltage.

12. The combination as recited in claim 11 wherein said gate means comprise means for applying said bias voltage $V_B$ at a constant amplitude during the gate pulse duration.

13. The combination as recited in claim 11 wherein said control means include voltage storage means and connecting means for connecting said voltage storage means to the amplifier output terminal during the absence of said gate pulse, and for decoupling said voltage storage means from said output terminal during the gate pulse duration, whereby in the absence of said gate pulse, said voltage storage means stores the output voltage and during the gate pulse duration said voltage storage means retains the last voltage stored therein, and means for applying said prebias voltage to said amplifier input means as a function of the voltage stored in said voltage storing means.

14. The combination as recited in claim 13 wherein said arrangement includes means for applying a first reference voltage to said first input terminal during at least the absence of said gate pulse, and means for controlling the voltage at said second terminal with respect to said first reference voltage as a function of the voltage stored in said voltage storing means so that the output voltage in the absence of said gate pulse is at substantially said selected level.

15. The combination as recited in claim 14 wherein said first and second input terminals are the non-inverting and inverting input terminals of said amplifier, said control means including a source of a second reference voltage, a first resistor connected between said second reference voltage and said second input terminal and a second resistor connected between said second input terminal and means at which a voltage is applied which is substantially equal to the voltage stored in said voltage storing means, whereby an increase in the voltage in said voltage storing means increases the voltage at said second inverting input terminal.

16. The combination as recited in claim 15 wherein said gate means include means for varying the resistance between said second reference voltage source and said second input terminal during the gate pulse period to thereby change the voltage thereat from the voltage applied thereto prior to the gate pulse by the bias voltage $V_B$.

17. In combination with a regenerative voltage circuit of the type including first and second input terminals defining input means and an output terminal at which an output voltage is provided at a level which is a function of the voltage difference between said output terminals, said output voltage level being switchable from a first level to a second level when said voltage difference exceeds a value defining a first trigger value of said circuit, with said output voltage being switchable from said second level to said first level when the voltage difference is less than a value defining a second trigger value of said circuit, which differs from said first trigger value, an arrangement comprising:

a gate terminal at which a gate pulse of a selected duration is applied;

control means coupled to said circuit and responsive to said gate pulse for automatically adjusting said voltage difference to equal said first trigger value so as to maintain the output voltage of said circuit at substantially said first level in the absence of said gate pulse and for biasing said input means by a bias voltage definable as $V_B$ during the gate pulse duration so as to vary the voltage difference from said trigger value by $V_B$ in a direction which maintains said output voltage at said first level, said control means including means for resetting said circuit in said first level when said output voltage is at said second level; and means including an input terminal at which an input signal is applied during the gate pulse duration coupled to said circuit for varying the voltage difference between said first and second input terminals in a direction toward said first trigger value by an input voltage, definable as $V_I$, which is related to the input signal amplitude, so that said voltage difference exceeds said first trigger value and said output voltage switches from said first level to said second level only when the amplitude of $V_I$ exceeds the amplitude of $V_B$.

18. The arrangement as recited in claim 17 wherein said control means include means for maintaining said bias voltage constant during the gate pulse duration.

19. The arrangement as recited in claim 17 wherein said control means include means for varying said bias voltage during said gate pulse duration.

20. In combination with an operational amplifier of the type including a pair of input terminals, defining amplifier input means, and an output terminal at which an output voltage is produced which is a function of the input voltage difference between said input terminals, said output voltage varying linearly in a linear region between an upper saturation level and a lower saturation level, said amplifier being characterized by a varying offset voltage definable as $V_{off}$ which represents the required voltage difference between said input terminals needed to maintain the output voltage at the same level in its linear region under different operating conditions, the arrangement comprising:

a gate terminal at which a gate pulse of a selected duration is applied;

control means coupled to said amplifier and responsive to said gate pulse for automatically controlling said input voltage difference during the absence of said gate pulse so that the output voltage is substantially constant at a first selected level in said linear region spaced apart from a second selected level, and for varying the input voltage difference during the gate pulse duration by a bias voltage definable as $V_B$, from the input voltage difference at the start of said gate pulse so that the output voltage level changes from said first selected level to a third level in a direction away from said second selected level; and means coupled to said circuit and including an input terminal at which an input signal is applied during the gate pulse duration for applying an input voltage to said circuit input means, said input voltage definable as $V_I$ being related to the amplitude of said input signal, said input voltage varying the input voltage difference in a direction so that said output voltage varies from said third level toward said first level, exceeding said second level only when the amplitude of said input voltage $V_I$ exceeds the amplitude of the bias voltage $V_B$ by a fixed factor which is independent of said off-set voltage.

21. In combination with a regenerative voltage circuit of the type including a pair of input terminals defining input means and an output terminal, the output voltage at said output terminal being switchable between said first and second levels, with the output voltage switching from said first to said second level only when the voltage difference between said input terminals deviates in a first direction from a first trigger value and said output voltage switches from said second level to said first level when the voltage difference deviates in a second direction from a second trigger value, which differs from said first trigger value, the arrangement comprising:

a gate terminal at which a gate pulse of a selected duration is applied;

control means coupled to said regenerative voltage circuit and to said gate terminal for applying to the input means of said circuit a prebias voltage to control said voltage difference to equal a selected one of said trigger values during the absence of a gate pulse and for maintaining said prebias voltage constant at the level applied just prior to the gate pulse during the gate pulse duration;

bias means responsive to said gate pulse for applying a bias voltage to said input means during the gate pulse duration so as to bias said voltage difference away from said selected trigger value; and circuit means responsive to an input signal and coupled to said input means for applying to said input means an input voltage at an amplitude related to the input signal amplitude to bias said voltage difference toward said selected trigger value thereby said output voltage changes from its level prior to the gate pulse to the other level only if the amplitude of said input voltage exceeds the bias voltage amplitude.

22. The arrangement as recited in claim 21 wherein said bias means include means for maintaining said bias voltage constant during said gate pulse duration.

23. The arrangement as recited in claim 21 wherein said bias means include means for varying the bias voltage during said gate pulse duration.

24. A signal detector responsive to applied input signals and gate pulses for providing an output signal which is indicative of the simultaneous occurrence of an input signal that exceeds a threshold value and a gate pulse, said detector having: a tunnel diode which is switchable from a low to a high voltage state in response to a current which exceeds a first value flowing therethrough and which is switchable from said high to said low voltage state when the current through the tunnel diode is less than a second value; control means for providing during the gate pulse intervals a pre-bias current substantially equal to said first value; bias means for reducing during the gate pulse intervals the current flowing through said tunnel diode by an amount which is a function of said threshold value; means for coupling said input signals to said tunnel diode during the gate pulse intervals; output means for producing an output signal when said tunnel diode is in its high voltage state during a gate pulse interval; and wherein the improvement comprises said control means including means for sensing when said tunnel diode is in its high voltage state; means for reducing the current through said tunnel diode below said second value for a first time interval following each time the high voltage state of said tunnel diode is sensed; means for producing a control signal, having a duration of a second time interval, following each time a high voltage state of said tunnel diode is sensed, with said second time interval being longer than said first time interval; integrator means for providing during the interval between gate pulses a pre-bias current which increases substantially linearly during the absence of said control signal and which decreases substantially linearly during the presence of said control signal and for providing a pre-bias current during the gate pulse intervals which is substantially equal to the value of the pre-bias current at the start of each respective gate pulse; and means for applying said pre-bias current to said tunnel diode.

25. The signal detector of claim 24 wherein said bias means includes means for varying, during the gate pulse interval, the current flowing through said tunnel diode.

* * * * *

PO-1050
(5/69)

UNITED STATES PATENT OFFICE
CERTIFICATE OF CORRECTION

Patent No. 3,828,204 Dated August 6, 1974

Inventor(s) Robert P. Farnsworth

It is certified that error appears in the above-identified patent and that said Letters Patent are hereby corrected as shown below:

Column 15, line 11, "am" should be --an--.
Column 17, line 49, after "said" insert --first--.
Column 19, line 9, "thereby" should be --whereby--.

Signed and sealed this 29th day of October 1974.

(SEAL)
Attest:

McCOY M. GIBSON JR.
Attesting Officer

C. MARSHALL DANN
Commissioner of Patents